United States Patent
Abramovich et al.

[19]
[11] Patent Number: 5,858,059
[45] Date of Patent: Jan. 12, 1999

[54] METHOD FOR INJECTING FEED STREAMS INTO A MOLTEN BATH

[75] Inventors: Shaul Abramovich, Fall River; Arthur White, Haverhill; Mihkel Mathiesen, Westport, all of Mass.

[73] Assignee: Molten Metal Technology, Inc., Waltham, Mass.

[21] Appl. No.: 823,344

[22] Filed: Mar. 24, 1997

[51] Int. Cl.⁶ .................................................. C21C 5/30
[52] U.S. Cl. .............................. 75/557; 266/47; 266/219; 266/268
[58] Field of Search .................. 266/47, 217, 219, 266/265, 268; 75/556, 557

[56] References Cited

U.S. PATENT DOCUMENTS

| | | | |
|---|---|---|---|
| 3,034,887 | 5/1962 | Henne | 75/60 |
| 3,271,132 | 9/1966 | Groves | 266/268 |
| 3,330,645 | 7/1967 | De Moustier et al. | 75/60 |
| 3,791,813 | 2/1974 | Ramachandran et al. | 75/59 |
| 3,871,633 | 3/1975 | Kolb et al. | 266/35 |
| 3,926,619 | 12/1975 | Etienne | 75/60 |
| 4,073,646 | 2/1978 | Kryczun et al. | 75/60 |
| 4,188,206 | 2/1980 | Johnsson et al. | 75/60 |
| 4,304,598 | 12/1981 | von Bogdandy et al. | 75/60 |
| 4,392,636 | 7/1983 | Clumpner | 266/218 |
| 4,396,179 | 8/1983 | Labate | 266/220 |
| 4,410,360 | 10/1983 | Katayama et al. | 75/60 |
| 4,443,252 | 4/1984 | Kreijger et al. | 75/48 |
| 4,574,714 | 3/1986 | Bach et al. | 110/346 |
| 5,257,280 | 10/1993 | Mimura et al. | 373/85 |
| 5,358,549 | 10/1994 | Nagel et al. | 75/414 |
| 5,407,461 | 4/1995 | Hardie et al. | 75/501 |
| 5,522,916 | 6/1996 | Karinthi et al. | 266/268 |
| 5,537,940 | 7/1996 | Nagel et al. | 110/346 |

*Primary Examiner*—Scott Kastler
*Attorney, Agent, or Firm*—Hamilton, Brook, Smith & Reynolds, P.C.

[57] ABSTRACT

First and second feed streams are injected into a molten bath, thereby creating first and second jets. The first and second jets combine to form a substantially planar, or fan jet, region within the molten bath. The first and second feed streams can include a variety of materials, such as oxidant, reducing agents, or waste materials, such as organic waste. In addition, the feed streams can include distinct reactants that are combined in the fan jet region for reaction with each other or with one or more components of the molten bath.

16 Claims, 2 Drawing Sheets

METHOD FOR INJECTING FEED STREAMS INTO A MOLTEN BATH

BACKGROUND OF THE INVENTION

In the metal smelting and refining industries, reactants often need to be efficiently added to melts to maximize the yield of reaction products and to minimize the required time for processing. Reactants can be injected into the melt, for example, through tuyeres mounted in the molten bath reactor bottom or sides, or through submerged lances. In order to increase the efficiency of reactions within a molten bath or to augment the quality of the melt, attempts have been made to increase the rate of injection of reactants so that the greatest possible amount of molten metal is exposed to the added reactants at any given time.

Submerged injection at the bottom of a molten metal bath within a reactor generally includes disadvantages, such as discontinuities in the flow pattern of injected gas, causing the melt in the reactor to impact on the reactor bottom during injection. This is often referred to as "back attack" and can cause significant erosion of the refractory lining. Injection at the walls of reactors does not in itself eliminate or significantly reduce this problem and can cause other problems, such as flow of reactants at reactor walls, thereby causing increased corrosion and erosion of refractory material lining the reactor.

Submerged injection, particularly injection from the reactor bottom, can also suffer from solidification of portions of the molten bath in the region of injection consequent to formation of a relatively stagnant region in the molten bath immediately adjacent to the injection point, and to a cooling effect of injection. This solidification process typically leads to the formation of semi-permeable solid structures, so-called "accretions", which can interfere with the injection of gases and reactants.

Furthermore, bottom injection can also suffer from insufficient interaction between reactants directed into the molten bath, and thus incomplete treatment, owing to limited residence time of the reactants in the melt. Bottom injection can also result in metal being projected out of the reaction zone to produce skulling which can solidify on the reactor walls, and thus become unavailable for the process. Even worse, skulling can block off gas passages, thereby disrupting the normal operation of the reactor.

Therefore, a need exists for a method for submerged injection of a feed into molten baths which overcomes or minimizes the above-mentioned problems.

SUMMARY OF THE INVENTION

The present invention relates to a new method for injecting reactants, such as gases, liquids and solids, including waste materials, into a molten bath.

The method includes directing a first feed stream through a first conduit into a molten bath to create a first jet. A second feed stream is directed through a second conduit into the molten bath to create a second jet. The first and second feed streams are positioned to combine and form a fan jet region.

In one specific embodiment of the present invention, feed streams, which may include waste materials, are directed through two individual pipes, or tuyeres, having a single passage or multiple concentric passages, into the molten bath. The pipes are typically mounted in a tuyere block. Outlets of the two pipes are oriented at an angle of between about 60 degrees and about 120 degrees, and preferably at a 90 degree angle to one another. This configuration can cause the injection jets from the two pipes to combine and retain in the gas phase at least 50% of the momentum with which they emerge from the pipes. The combination of the two jets causes a near-planar region, or "fan jet region," to form, which subsequently breaks into a rising plume of bubbles once the momentum of the combined jets has been substantially depleted. The plume is a gaseous dispersion of bubbles. One or more such tuyere blocks can be placed in the bottom of a reactor, projecting the fan jet region in an upward direction, which disperses into a plume of bubbles that also ascends through the bath. The gaseous dispersion can provide relatively high reaction rates, and the nature of the flat, or nearly flat, symmetrical jet, or fan jet, region, and the finely dispersed plume of bubbles, eliminates or minimizes large flow discontinuities within the molten bath, thereby eliminating or significantly reducing back attack.

In another embodiment of the present invention, feed streams, which can include waste materials, are injected through two individual pipes, or tuyeres, which are oriented at a 60 to 120 degree, and preferably a 90 degree, angle to one another into the molten bath. Pairs of pipes are typically mounted in a tuyere block. The tuyere block, or blocks, is, or are, positioned away from the reactor bottom, whereby the pipes are oriented to form a plane that is at a 30 to 90 degree angle with a vertical plane, and more preferably at an angle of 45 to 90 degrees with a vertical plane, and are mounted in the side wall of the reactor. The combination of each pair of jets emanating from the tuyere block pipes causes a fan jet region to form in which the two feed streams admix within the molten bath, which breaks into a plume of bubbles once the jet momentum has been substantially depleted. Buoyancy forces cause the plume to rise vertically, providing a dispersed bubble region where the injected feed reacts. The position of the pipes of the tuyere block is preferably selected such that the fan jet region is essentially parallel with a horizontal plane. This is achieved by installing the pipes in the tuyere block in an orientation whereby the plane occupied by the two pipes is perpendicular to a reactor horizontal cross section.

In a further embodiment, suitable feed streams, such as organic waste material, can be injected into the reactor through pairs of pipes from several injection points in the reactor side wall, or side walls, typically using tuyere blocks arranged at identical vertical levels in the reactor and arranged at identical angles to the vertical in a range of 30 to 90 degrees, with a plane, or planes, occupied by each pair of pipes being perpendicular, or nearly perpendicular, to the reactor horizontal cross section, to form multiple regions of injected and reacting feed material in the reactor. For example, in the case of injecting waste materials, multiple regions are formed where waste materials dissociate to form dissociation products, thereby treating the waste material in the reactor.

Multiple injection locations generally should be spaced such that plumes formed by the jets combine, if at all, only to a minimum extent and thereby substantially avoid unwanted coalescence of individual bubbles which might contribute to molten bath splashing and/or limit the rate of desired reactions.

The deployment of multiple pipe pairs provides the additional advantage of enabling switching from one injection point to another, thereby allowing continued processing should operating disturbances be encountered in one injection location.

This invention, in its many embodiments, provides several advantages over known techniques for submerged injection into molten baths. For example, finely dispersed bubbles of a plume formed from the fan jet region of convergent gaseous streams provide an increased gas/liquid interface between the molten bath and reactants in the feed streams. As a consequence of the increased interface, reaction rates between reactants in the feed streams and in the molten bath can be significantly increased. Further, decreased bubble sizes limit the generation of dust discharged from the molten bath. Build up of accretions around the pipes can be significantly reduced or completely suppressed. Furthermore, "back attack" caused by the feed streams is minimized or completely eliminated. Additionally, the finely and widely dispersed bubbles of the resultant plumes provide for relatively quiescent process conditions which, in turn, provide improved reaction conditions and reduce reactor maintenance requirements.

DETAILED DESCRIPTION OF THE INVENTION

The features and other details of the method of the invention will now be more particularly described with reference to the accompanying drawing and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention. All parts and percentages are by weight unless otherwise specified.

The present invention relates generally to a method for submerged injection of gaseous feed streams into a molten bath. A process and apparatus for dissociating a gaseous stream including a waste composition in a molten bath are disclosed in U.S. Pat. Nos. 4,574,714 and 4,602,574, issued to Bach et al. The method and apparatus can destroy, for example, polychlorinated biphenyls and other organic wastes, optionally together with inorganic wastes. The teachings of both U.S. Pat. Nos. 4,574,714 and 4,602,574 are hereby incorporated by reference.

Figure 1:
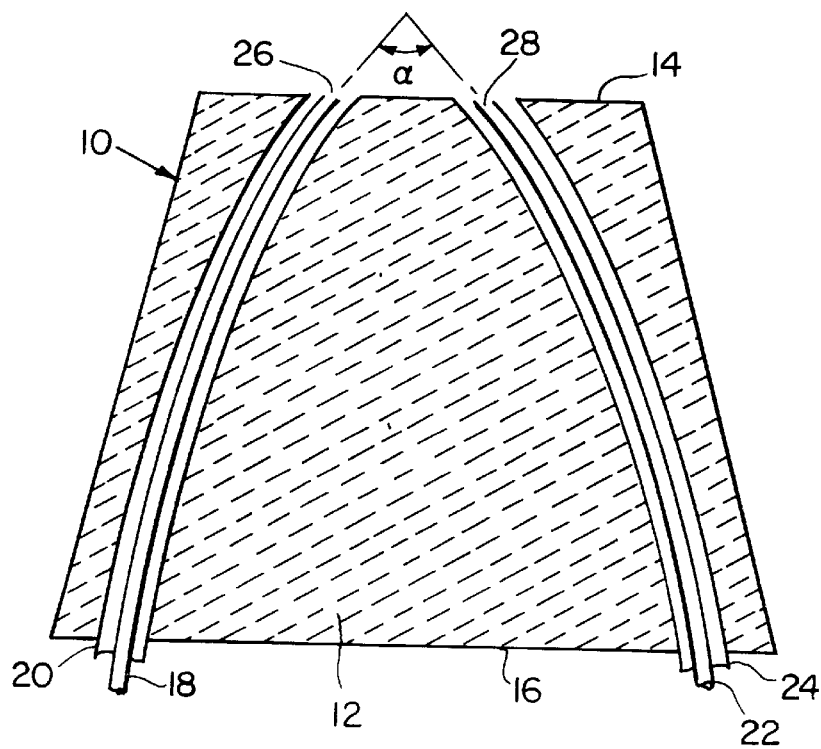
FIG. 1 is a cut-away side cross sectional view of a tuyere block with a pair of pipes arranged so as to provide a substantially flat, symmetrical, fan jet region of combined feed streams.

One embodiment of apparatus that can be employed to practice the method of the invention is shown in FIG. 1. Therein, tuyere block 10 includes refractory support 12 having inward surface 14 and outward surface 16. First pipe 18, extends as a conduit through tuyere block 10 between outward surface 16 and inward surface 14, and is located concentrically within first coolant tube 20. Second pipe 22 also extends as a conduit between outward surface 16 and inward surface 14, and is located concentrically within second coolant tube 24.

First pipe 18 and second pipe 22 are angled near inward surface 14 and are configured to enable feed streams directed through first pipe and second pipe to converge at an angle α. Preferably, angle α is in a range of between about 60 degrees and about 120 degrees of arc. Preferably, angle α is in a range of between about 80 and about 100 degrees, and most preferably is about 90 degrees.

Openings 26, 28 of first pipe 18 and second pipe 22 are located at a distance from each other to enable feed streams injected into the bath to combine and form a substantially flat, planar fan jet region within a molten bath. Generally, the distance between openings of first pipe 18 and second pipe 22 is in a region of between about one millimeter and about ten millimeters (mm). Openings 26, 28 typically have an internal diameter in a range of between about one mm and fifty mm. Preferably the internal diameter is in a range of between about six mm and twenty-five mm.

Alternatively, multiple concentric tuyeres, such as triple-concentric tuyeres, can be employed, wherein each pair of multiple concentric tuyeres is located within a tuyere block. Further, separate tuyeres can be independently mounted within a refractory lining of a reactor to thereby enable injection of feed streams that converge and form a substantially planar fan jet region.

Figure 2:
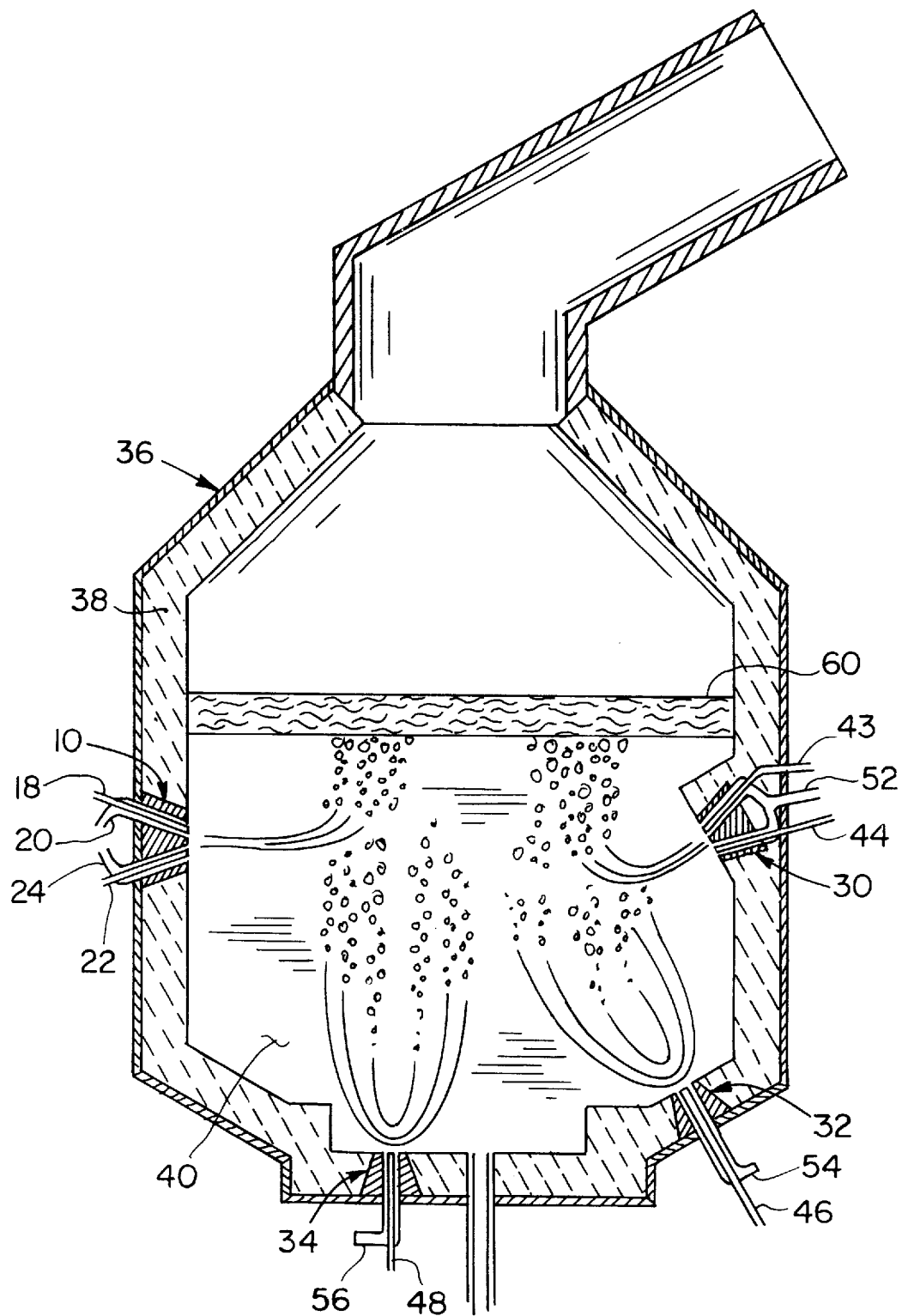
FIG. 2 is a cut-away side elevational view of another embodiment of apparatus employed to conduct the method of the present invention.

Tuyere blocks 10, 30, 32 and 34 are located at reactor 36 in refractory lining 38, as shown in FIG. 2. Tuyere blocks 10, 20, 32 and 34 are shown in various positions within reactor 36 to make clear that the method of the invention can be conducted at different submerged locations beneath the surface of molten bath 40 within reactor 36.

Typically, the openings of each tuyere block are located at least about 200 mm below the plane of the expected upper surface of molten bath during operation. Preferably, the openings are located at least about 800 mm below the upper surface of molten bath.

Tuyere blocks 10, 30, 32 and 34 can be positioned so that a planar or fan jet region formed by the combination of first and second feed streams is at an angle to a vertical plane in a range of between about 30 degrees and about 90 degrees. Tuyere block 30 directs feed from feed pipes 43, 44 to form a fan jet region that is at an angle of about 45 degrees to a vertical plane. Tuyere block 32, on the other hand, is positioned to direct feed streams along a plane that is positioned at an angle of about 30 degrees to a vertical plane. The resulting fan jet region is parallel to a vertical plane.

In one specific embodiment, not shown, the tuyere blocks can be arrayed at a single elevation. In this embodiment, the planar fan jet region emanating from each tuyere block preferably is perpendicular to a horizontal plane.

Tuyere blocks 32, 34 are shown at an angle wherein only a single feed pipe 46, 48 of each tuyere block is visible. The other feed pipe of each tuyere block is positioned behind the visible feed pipe. If the tuyere blocks were rotated 90 degrees, both first and second feed pipes and first and second coolant tubes of these tuyere blocks would be visible in FIG. 2. It is to be understood that feed streams can be directed through the first and second pipes of each tuyere block along a plane that is horizontal or vertical. First and second pipes of each tuyere block are connected to at least one feed source, not shown. Coolant tubes 20 and 24 of tuyere block 10, and visible coolant tubes 52, 54, 56 of tuyere blocks 30, 32 and 34, respectively, are connected to at least one suitable coolant source, also not shown. It is also to be understood that tuyere blocks can include first and second pipes that are not jacketed by coolant tubes, or may include multiple concentric passages.

Molten bath 40 within reactor 36 can include metals or molten salts, or combinations thereof. Examples of suitable metals include iron, copper, nickel, zinc, etc. Examples of suitable salts include sodium chloride, potassium chloride, etc. Molten bath 40 can also include more than one metal. For example, molten bath 40 can include a solution of miscible metals, such as iron and nickel. Alternatively, molten bath 40 can include a combination of immiscible metals. In one embodiment, molten bath can be formed substantially of metal in its elemental state. Molten bath 40 is typically formed by at least partially filling a reactor with a suitable metal or salt and then heating to a suitable temperature by activation of an induction coil, not shown, or by some other suitable means.

Vitreous layer 60 is formed on molten bath 40 and can be substantially immiscible with molten bath 40. Typically, vitreous layer 60 has a lower thermal conductivity than that of molten bath 40, whereby radiant heat loss from molten bath 40 is significantly reduced. Generally, vitreous layer 60 includes at least one metal oxide, and can contain a suitable compound for scrubbing halogens, such as chlorine or fluorine, to prevent formation of halogen halide gases, such as hydrogen chloride. In one embodiment, the vitreous layer 60 includes a metal oxide, such as calcium oxide, having a free energy of reaction, at the operating conditions of the method, which is less than that for the reaction of atomic carbon to form carbon monoxide.

An example of suitable operating conditions of the method include a temperature of molten bath 40 which is sufficient to at least partially convert carbonatious feed compositions by dissociation to elemental carbon and other constituents, such as carbon oxides, nitrogen, oxide and hydrogen. Generally, a temperature in a range between about 1,200° and about 1,700° C. is suitable.

The method includes directing at least one suitable feed stream through the first and second pipes of each tuyere block. In one embodiment, a first feed stream is directed through the first pipe of at least one tuyere block and a second feed stream is directed through the second pipe of the tuyere block.

Feed streams can include a wide variety of materials. For example, in one embodiment, oxygen can be employed as a feed stream to reduce the carbon content of a molten ferrous bath. Alternatively, the method of the invention can be employed to treat various feed materials, such as waste compositions. Examples of suitable waste compositions include organic chemicals, such as polybrominated biphenyls, polychlorinated biphenyls, dioxins, pesticides, solvents, paints, etc. Other suitable feed streams include hydrocarbons, such as coal. Radioactive feeds can also be processed by the method of this invention.

The feed stream directed through the first and second pipes can be in the form of a gas, a liquid or a solid, or a combination thereof. Preferably, the solid or liquid volume of the feed streams should be less than about five percent, by volume. If a solid is directed through the feed pipes, preferably it is comminuted. The feed stream can include mixtures of reactants including, for example, oxygen gas.

Figure 3:
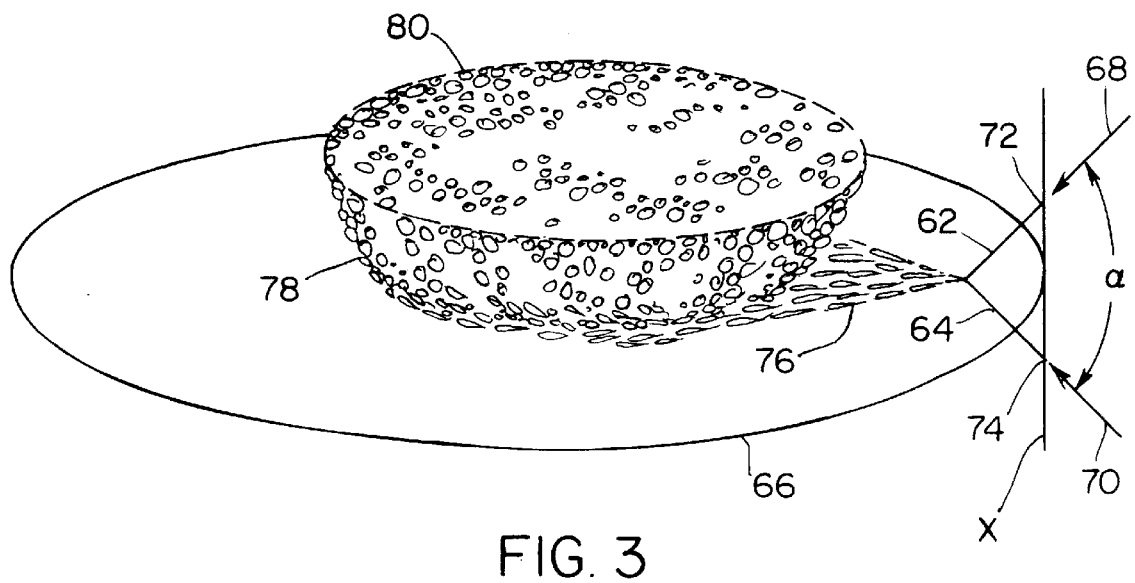
FIG. 3 is a schematic diagram of a vertical planar arrangement of feed streams forming a horizontal planar fan jet region and a resulting plume rising vertically through a molten bath in a reactor.

The feed streams are directed through the first and second pipes of each tuyere block at a rate that is sufficient to form first jet 62 and second jet 64, respectively, which are shown schematically in FIG. 3. In one embodiment, first jet 62 and second jet 64 form a vertical planar section that intersects an inner wall of a reactor along a line X. The vertical planar section is perpendicular to horizontal planar section 66 of a molten bath. First jet 62 and second jet 64 direct feed in converging directions indicated by arrows 68, 70 at angle α. The velocity of feed in each jet is in a range of between about 0.4 Mach and about 2.0 Mach at points of entry 72, 74 into the molten bath. First jet 62 and second jet 64 combine to form a substantially horizontal planar continuous region, termed a "fan jet region" 76. Fan jet region 76 typically occupies a planar surface area in a range of between about 0.01 cm$^2$ to about 5,000 cm$^2$. Loss of gas momentum within the fan jet region 76 causes gases passing through the fan jet region to form plume 78 of relatively uniformly dispersed fine bubbles having a relatively high ratio of gas surface area to volume. Plume 78 of dispersed gaseous bubbles provides a favorable region for complete reaction of feed materials. Bubbles within plane 78 rise to the upper surface of the molten bath. Bubbles at the upper surface of the molten bath are represented by plane 80.

Feed is directed through first and second pipes of each tuyere block at a velocity that is sufficient to form a fan jet region proximate to each tuyere block, but distinct and without interfering with fan jet regions formed at other tuyere blocks. Contact of gaseous reactants with the molten bath is thereby greatly enhanced by formation of each plume, to cause relatively rapid conversion of reactants without causing a substantial amount of splashing of the molten bath; the molten bath will tend to remain in a substantially quiescent state during injection of feed materials.

EQUIVALENTS

Those skilled in the art will recognize, or be able to ascertain using no more than routine experimentation, many equivalents to the specific embodiments of the invention described specifically herein. Such equivalents are intended to be encompassed in the scope of the claims.

We claim:

1. A method for injecting feed streams into a molten bath, comprising the steps of:
    a) injecting a first feed stream through a first conduit into the molten bath, creating a first jet; and
    b) injecting a second feed stream through a second conduit into the molten bath, creating a second jet, said second conduit being positioned to cause said first and second jets to combine to form a fan jet region within said molten bath.

2. The method of claim 1, wherein said feed streams are directed into the molten bath at a relative angle in a range of between about 60 degrees and about 120 degrees.

3. The method of claim 2, wherein said feed streams are directed into the molten bath at a relative angle of about 90 degrees.

4. The method of claim 1 wherein the feed streams are directed into the molten bath through conduits that are at a distance in a range of between about 1 and about 10 mm from one another at the molten bath.

5. The method of claim 1 wherein the feed streams are directed into the molten bath through conduits having internal diameters that are in a range of between about between about 1 and about 50 mm at the molten bath.

6. The method of claim 5 wherein the feed streams are directed into the molten bath through conduits having internal diameters that are in a range of between about 6 and about 25 mm at the molten bath.

7. The method of claim 1 wherein the velocities of the first and second jets at their points of injection into the molten bath are in a range of between about 0.4 Mach and about 2.0 Mach.

8. The method of claim 1 wherein the first and second jets form a plane that is substantially perpendicular to a horizontal cross plane.

9. The method of claim 1 wherein the first and second jets form a plane that is at an angle that is in a range of between about 30 degrees and about 90 degrees to a vertical plane.

10. The method of claim 9 wherein the first and second jets form a plane that is at an angle that is in a range of between about 45 degrees and about 90 degrees to a vertical plane.

11. The method of claim 1 further including the steps of directing additional feed streams in interfering relation to each other to thereby form at least one additional fan jet region.

12. The method of claim 11 wherein the fan jet regions are at about the same elevation.

13. The method of claim 1 wherein the feed streams are directed through conduits that are at least about 200 mm below an upper surface of the molten bath.

14. The method of claim 1 wherein the feed streams are directed through conduits that are at least about 500 mm below an upper surface of the molten bath.

15. The method of claim 1 wherein at least one feed stream includes a waste material.

16. The method of claim 1 wherein at least one feed stream includes an oxidant.

* * * * *